United States Patent [19]
Richards

[11] Patent Number: 4,817,083
[45] Date of Patent: Mar. 28, 1989

[54] REARRANGEABLE MULTICONNECTION SWITCHING NETWORKS EMPLOYING BOTH SPACE DIVISION AND TIME DIVISION SWITCHING

[75] Inventor: Gaylord W. Richards, Naperville, Ill.

[73] Assignee: American Telephone and Telegraph Company AT&T Bell Laboratories, Murray Hill, N.J.

[21] Appl. No.: 23,112

[22] Filed: Mar. 6, 1987

[51] Int. Cl.$^4$ .......................................... H04Q 11/04
[52] U.S. Cl. ........................................ 370/59; 370/58
[58] Field of Search ...................... 370/58, 59, 63, 68; 340/825.79, 825.8

[56] References Cited

U.S. PATENT DOCUMENTS

| | | | |
|---|---|---|---|
| 3,129,407 | 4/1964 | Paull | 340/827 |
| 3,735,049 | 5/1973 | Buchner et al. | 370/58 |
| 3,890,469 | 6/1975 | Kelly et al. | 370/59 |
| 3,906,161 | 9/1975 | Schlichte | 370/59 |
| 3,906,164 | 9/1975 | Philip et al. | 370/68 |
| 3,912,873 | 10/1975 | Skaperda | 370/63 |
| 3,927,267 | 12/1975 | Voyer et al. | 370/63 |
| 3,974,340 | 8/1976 | Ghisler | 370/63 |
| 4,038,638 | 7/1977 | Hwang | 340/825.8 |
| 4,261,052 | 4/1981 | Persson et al. | 370/59 |
| 4,365,330 | 12/1982 | Chopping et al. | 370/58 |
| 4,398,285 | 8/1983 | Lutz et al. | 370/58 |
| 4,566,007 | 1/1986 | Richards | 340/825.8 |
| 4,654,842 | 3/1987 | Coraluppi et al. | 370/58 |

FOREIGN PATENT DOCUMENTS 3030828 2/1982 Fed. Rep. of Germany ........ 370/58

OTHER PUBLICATIONS

"Ease of Expansion of the GTD-4600 Digital PABX", Karsas, International Switching Symposium, Paris, France, May 7-11, 1979.
C. Clos, "A Study on Non-Blocking Switching Networks", *The Bell System Technical Journal*, Mar. 1953, pp. 406-424.
V. E. Benes, "On Rearrangeable Three-Stage Connecting Networks", *The Bell System Technical Journal*, vol. XLI, No. 5, Sep. 1962, pp. 1481-1492.
G. M. Masson, "Binomial Switching Networks for Concentration and Distribution", *IEEE Transactions on Communications*, vol. Com-25, No. 9, Sep. 1977, pp. 873-883.
Masayuki Tanaka, "Nonblocking Switching in Integrated PCM Networks", Sixth International Teletraffic Congress, Munich, Sep. 9-15, 1970.
P. Fleming, Jr., "Traffic Consideration of Digital Class 5 Offices", Ninth International Teletraffic Congress, Spain, Oct. 17-24, 1979.
F. K. Hwang, "Three-Stage Multiconnection Networks which are Nonblocking in the Wide Sense", *The Bell System Technical Journal*, vol. 58, No. 10, Dec. 1979, pp. 2183-2187.
R. W. Kufta, *Interconnection Networks with Fan-Out Capabilities* Thesis, May 1983.
R. W. Kufta et al., "Multiple Stage Switching Networks with Fan-Out Capabilities", *Proceedings of the IEEE Computer Network Symposium*, Dec. 13, 1983, pp. 89-96.

*Primary Examiner*—A. D. Pellinen
*Assistant Examiner*—Geoffrey S. Evans
*Attorney, Agent, or Firm*—Ross T. Watland

[57] ABSTRACT

A switching network including both space division and time division switching stages where a permanent connection arrangement, interposed between the network input channels and a larger number of internal, time division channels at the input side of the space division stage, provides permanent rather than switched connections between each input channel and multiple internal channels. The pattern of permanent connections to multiple internal channels is designed such that the network is rearrangeable to avoid blocking to connect any idle output channel of the network to any busy or idle input channel.

15 Claims, 7 Drawing Sheets

$$\begin{bmatrix} 1 & 6 & 11 & 16 & 21 \\ 2 & 7 & 12 & 17 & 22 \\ 3 & 8 & 13 & 18 & 23 \\ 4 & 9 & 14 & 19 & 24 \\ 5 & 10 & 15 & 20 & 25 \\ \overline{1} & 10 & 14 & 18 & \overline{22} \\ 2 & 6 & 15 & 19 & 23 \\ 3 & 7 & 11 & 20 & 24 \\ 4 & 8 & 12 & 16 & 25 \\ 5 & 9 & 13 & 17 & 21 \end{bmatrix}$$

FIG. 5

REARRANGEABLE MULTICONNECTION SWITCHING NETWORKS EMPLOYING BOTH SPACE DIVISION AND TIME DIVISION SWITCHING

BACKGROUND AND PROBLEM

It is possible for a customer facility connected to a multistage switching network to occasionally be blocked from being connected as desired because the network happens to be interconnected in a manner that prevents effecting the desired interconnection. This, of course, is an undesirable situation which, in an appropriately designed network, is remedied by dismantling one or more existing interconnections and rearranging the interconnection paths to accommodate the new request. When such a rearrangement is possible, it is said that the new assignment, which is the new set of interconnections desired to be established, is realizable. A switching network which can realize all possible assignments without rearranging existing connections is said to be nonblocking, while a network which can realize all possible assignments only by occasionally rearranging existing connections is said to be rearrangeable. Typical rearrangeable networks have many fewer crosspoints than their non-blocking counterparts.

U.S. Pat. No. 4,556,007 issued to G. W. Richards on Jan. 21, 1986, discloses a two-stage, rearrangeable multiconnection (broadcast) switching network including an innovative connection arrangement that permanently connects each network input channel to a multiplicity of first stage switch inlets in a predetermined pattern. For any given assignment of input channels to the network output channels connected to a second stage switch, the network can always be arranged such that each input channel is connected by a different first stage switch to the second stage switch and therefore to the output channels which are assigned that input channel. Accordingly, the switching network is a rearrangeable multiconnection network that avoids blocking. The innovative connection pattern advantageously eliminates the need for additional stages of switching thereby reducing both the total number of network crosspoints and the number of crosspoints used to effect each interconnection.

Although the network disclosed in the above-mentioned Richards patent represents an important advance in the art, its reliance on space division switching techniques makes it relatively expensive. In addition, rearrangements in such space division networks sometimes result in open intervals or lost information.

In view of the foregoing, a recognized problem in the art is the expense and reduced communication integrity of known multiconnection networks.

SOLUTION

The foregoing problem is solved and a technical advance is achieved in accordance with the principles of the invention in an exemplary switching network advantageously including both space division and time division switching stages and where a permanent connection arrangement, interposed between the network input channels and a larger number of internal, time division channels at the input side of the space division stage, provides permanent rather than switched connections between each input channel and, significantly, multiple internal channels. Advantageously, the pattern of permanent connections to multiple internal channels is designed such that the network is rearrangeable to avoid blocking to connect any idle output channel of the network to any busy or idle input channel. Significant economies are obtained because the elements of the network are used on a time-shared basis. Rearrangements are effected without the possibility of open intervals or lost information by changing the connections through the space division and time division switching stages prior to the next time division frame.

A switching network in accordance with the invention is operative in time division frames comprising B time slots of substantially fixed duration and provides switched connections from $N_1$ input channels to $n_2$ output channels. The network includes AB internal channels comprising A links operative in the B time slots. A space division switching stage, connected to the A links and having at least one output port, provides space-switched connections from the A links to the output port. A time division switching stage connected to the output port provides time-switched connection from time slots at the output port to the $n_2$ output channels. A connection arrangement permanently connects each of the $N_1$ input channels to multiple ones of the AB internal channels.

In the illustrative embodiments of the invention described herein, the connection arrangement permanently connects each of the $N_1$ input channels to multiple ones of the AB internal channels such that for any group of $n_2$ of the input channels, the switching network is rearrangeable to avoid blocking to connect the group of $n_2$ input channels to the $n_2$ output channels. A control processor is responsive to a blocked condition of the network for controlling a rearrangement of connections of the space division switching stage and the time division switching stage.

In one illustrative embodiment of the invention, the connection arrangement permanently connects each of the $N_1$ input channels to M of the AB internal channels such that for any group of $n_2$ of the input channels, that group of $n_2$ input channels is connected to a corresponding group of $n_2$ of the internal channels, where each internal channel of the group of $n_2$ internal channels comprises a different one of the B time slots.

In a second illustrative embodiment of the invention, the A links comprise K groups each comprising at most C links. The space division switching stage has at least K output ports and comprises K space division switches each providing space-switched connections from one of the K groups of links to one of the output ports. The time division switching stage is connected to the K output ports and provides time-switched connections from time slots at the K output ports to the $n_2$ output channels. The connection arrangement permanently connects each of the $N_1$ input channels to M of the AB internal channels such that for any group of $n_2$ of the input channels, that group of $n_2$ input channels is connected to a corresponding group of $n_2$ of the internal channels where, for each of the K groups of links, each internal channel of the group of $n_2$ internal channels that is on that group of links comprises a different one of the B time slots.

DRAWING DESCRIPTION

FIG. 5 shows a connection matrix;

DETAILED DESCRIPTION

Figure 1:
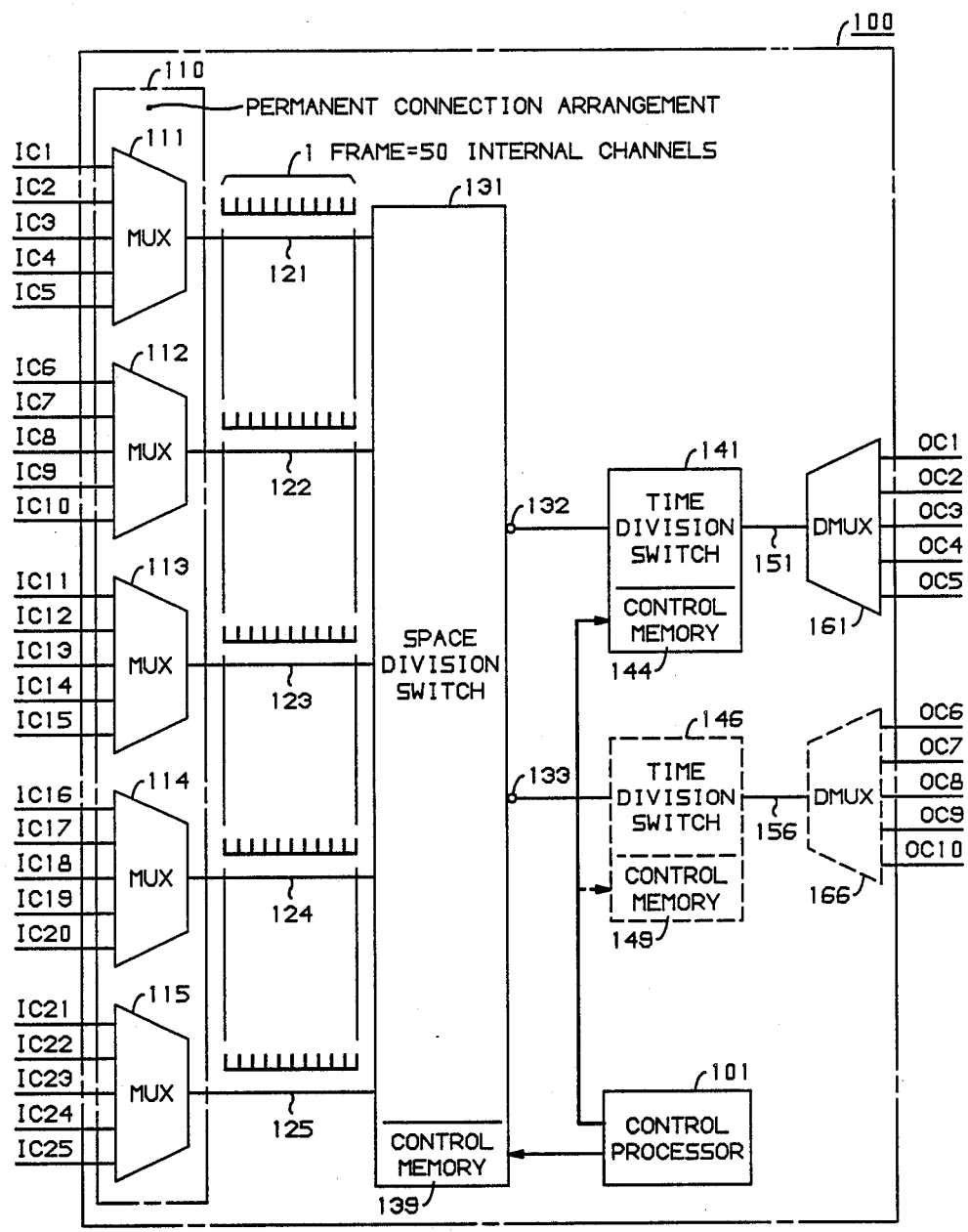
FIG. 1 is a block diagram of a rearrangeable multiconnection network embodiment in accordance with the invention.
Figure 2:
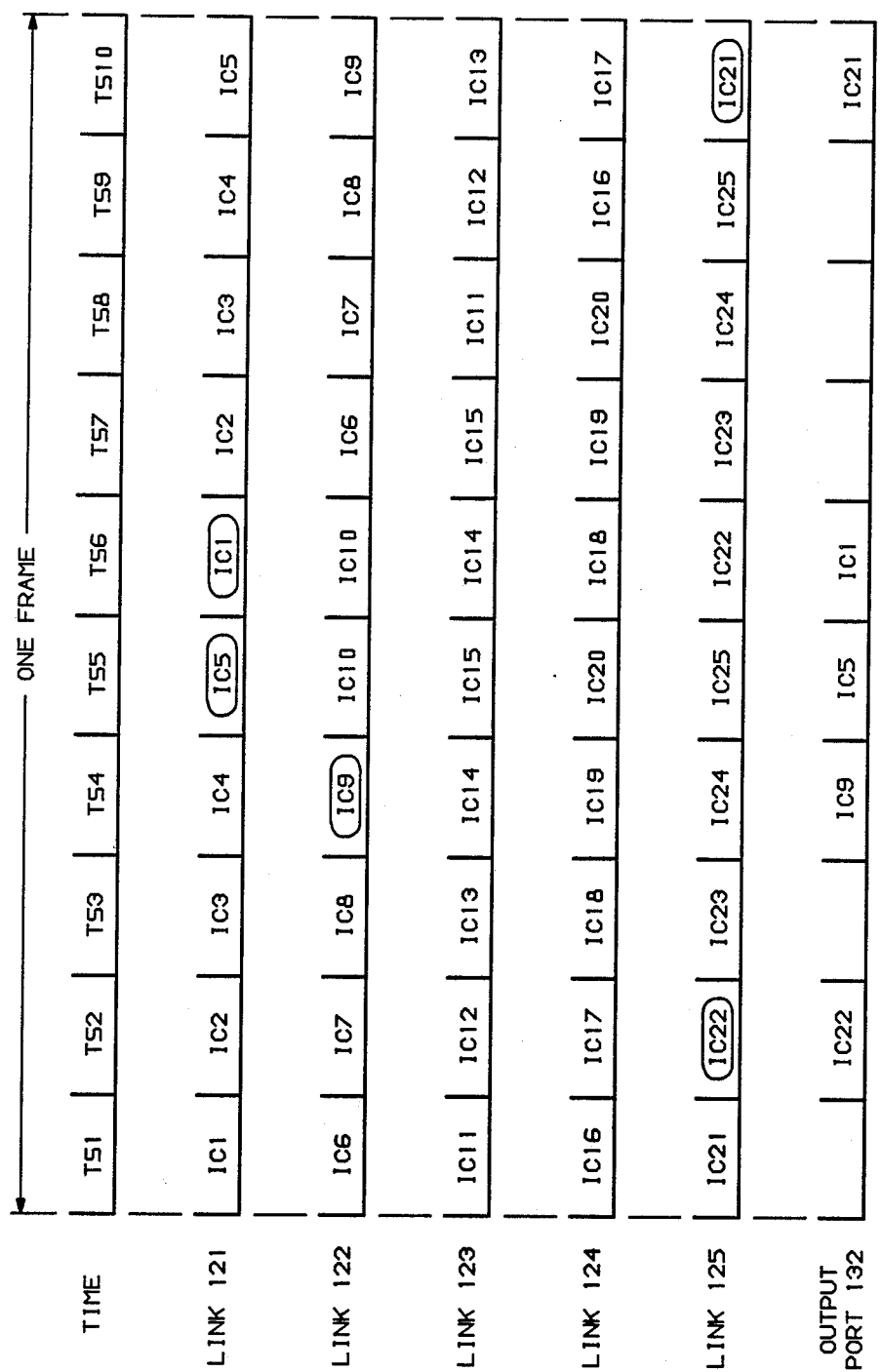
FIG. 2 is a diagram showing the connections effected by a connection arrangement included in the network of FIG 1.

In FIG. 1, network 100 switches information from 25 input channels IC1 through IC25 to five output channels OC1 through OC5. Network 100 has 50 internal channels comprising five time-multiplexed links 121 through 125 each comprising ten time slots. A permanent connection arrangement 110 connects each of the 25 input channels to two of the 50 internal channels. The connections effected by arrangement 110 are depicted in the diagram of FIG. 2 for one frame comprising ten time slots TS1 through TS10 on the links 121 through 125. Arrangement 110 includes five fixed-assignment, time division multiplexers 111 through 115. Multiplexer 111, for example, connects each of the five input channels IC1 through IC5 to two internal channels, comprising two time slots on link 121, by connecting the input channels to link 121 in the following fixed sequence during each frame of ten time slots TS1 through TS10: IC1, IC2, IC3, IC4, IC5, IC1, IC2, IC3, IC4, IC5. Similarly, multiplexer 112 connects each of the five input channels IC6 through IC10 to two internal channels, comprising two time slots on link 122, by connecting the input channels to link 122 in the following fixed sequence: IC6, IC7, IC8, IC9, IC10, IC10, IC6, IC7, IC8, IC9. These sequences and the sequences effected by multiplexers 113, 114 and 115 on links 123, 124, and 125 are given in FIG. 2.

Network 100 (FIG. 1) further includes a time-shared, space division switch 131, a time-multiplexed switch, operative in frames comprising ten time slots TS1 through TS10. During each time slot, switch 131 connects one of the links 121 through 125 to an output port 132. Switch 131 is reconfigured ten times per frame in accordance with instructions stored in a control memory 139 by a control processor 101 when a particular switched connection is established. Information is transmitted from switch 131 via output port 132 to a time division switch 141, a time-slot interchanger. Switch 141 performs a selection and reordering of up to five of the ten time slots at output port 132 for transmission on a time-multiplexed link 151 to a demultiplexer 161. A frame comprising ten time slots at output port 132 corresponds to a frame comprising five time slots on link 151. Within switch 141, the selection and reordering of time slots is accomplished based on instructions stored in a control memory 144 by control processor 101. Switch 141 performs a broadcast function within network 100 by transmitting information from a single time slot at output port 132 on as many as all five time slots on link 151. The information in the five time slots on link 151 is then distributed by a demultiplexer 161 in sequential fashion to the five output channels OC1 through OC5.

For any group of five of the input channels IC1 through IC25, network 100 is rearrangeable to avoid blocking to connect the group of five input channels to the five output channels OC1 through OC5. Consider the group of input channels IC1, IC5, IC9, IC21, and IC22. The group of input channels is connected to a corresponding group of five internal channels each comprising a different one of the ten time slots TS1 through TS10 as indicated by the circled entries in the diagram of FIG. 2. Input channel IC1 is connected to the internal channel comprising link 121, time slot TS6; input channel IC5 is connected to the internal channel comprising link 121, time slot TS5; input channel IC9 is connected to the internal channel comprising link 122, time slot TS4; input channel IC21 is connected to the internal channel comprising link 125, time slot TS10; input channel IC22 is connected to the internal channel comprising link 125, time slot TS2. Thus in a particular example where output channels OC1 through OC5 are to be connected to input channels IC1, IC21, IC5, IC9 and IC22, respectively, control processor 101 writes instructions into control memory 139 such that, during time slots TS2, TS4, TS5, TS6, and TS10, switch 131 connects links 125, 122, 121, 121, and 125, respectively, to output port 132. The information transmitted by switch 131 at output port 132 is as shown in FIG. 2. Control processor 101 also writes instructions into control memory 144 such that switch 141 connects time slots TS2, TS4, TS5, TS6, and TS10 at output port 132 to time slots TS5, TS4, TS3, TS1, and TS2, respectively on link 151. Thus demultiplexer 161 sequentially distributes the information from input channels IC1, IC21, IC5, IC9, and IC22, to output channels OC1 through OC5, respectively. Since a corresponding group of internal channels comprising different time slots can be found for any group of five input channels, network 100 is always rearrangeable to avoid blocking.

Figure 3:
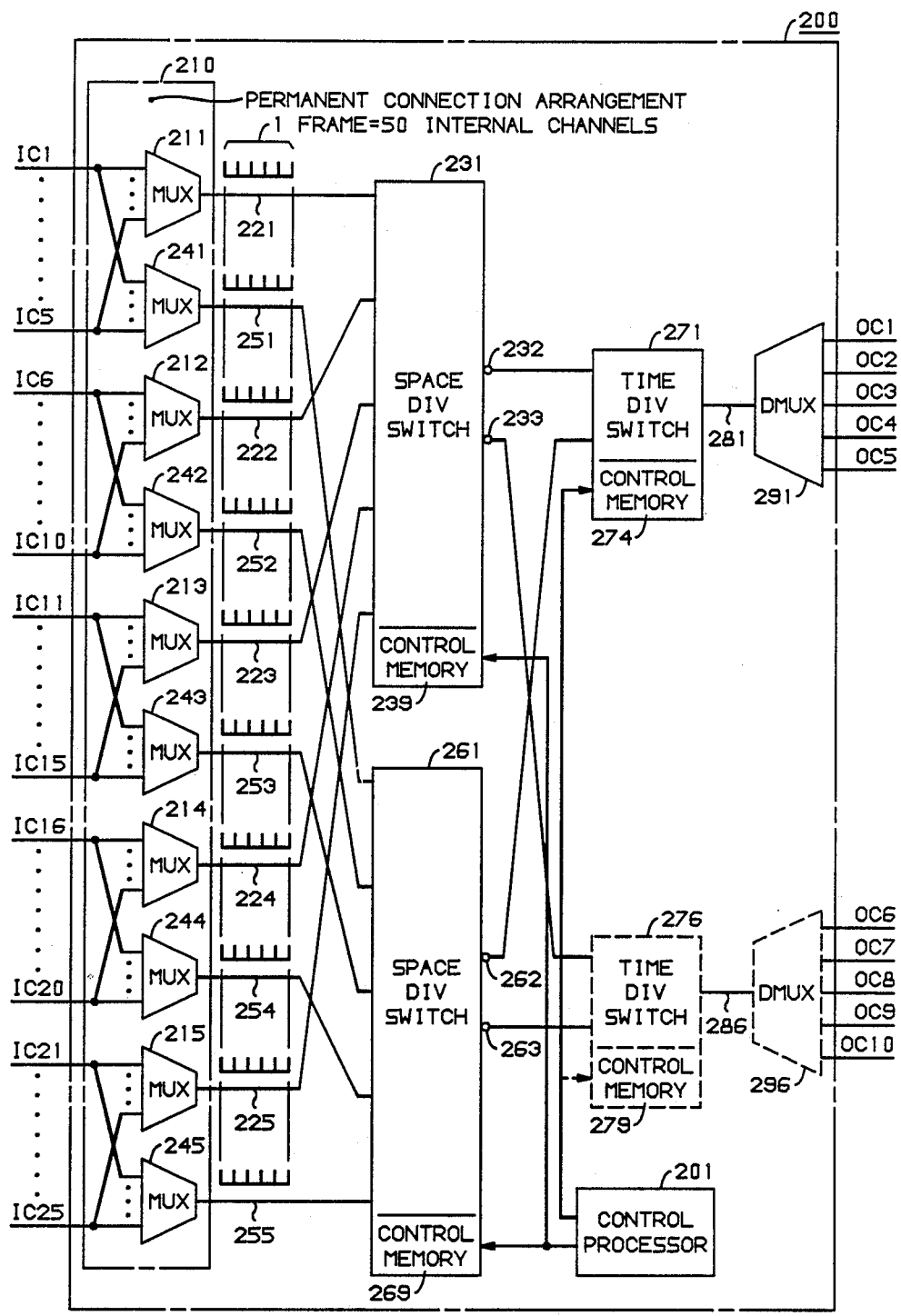
FIG. 3 is a block diagram of a second rearrangeable multiconnection network embodiment in accordance with the invention.

In FIG. 3, network 200 switches information from 25 input channels IC1 through IC25 to five output channels OC1 through OC5. Network 200 has 50 internal channels comprising ten time-multiplexed links 221 through 225 and 251 through 255 each comprising five time slots. A permanent connection arrangement 210 connects each of the 25 input channels to two of the 50 internal channels. The connections effected by arrangement 210 are depicted in the diagram of of FIG. 4 for one frame comprising five time slots TS1 through TS5 on the links 221 through 225 and 251 through 255. Arrangement 210 includes ten fixed-assignment, time division multiplexers 211 through 215 and 241 through 245. Multiplexers 211 and 241, for example, connect each of the five input channels IC1 through IC5 to two internal channels, comprising one time slot on link 221 and one time slot on link 251. Multiplexer 211 connects the input channels to link 221 in the following fixed sequence during each frame of five time slots TS1 through TS5: IC1, IC2, IC3, IC4, IC5. Multiplexer 241 connects the input channels to link 251 in the sequence IC1, IC2, IC3, IC4, IC5. Similarly, multiplexers 212 and 242 connect each of the five input channels IC6 through IC10 to two internal channels, comprising one time slot on link 222 and one time slot on link 252. Multiplexer 212 connects the input channels to link 222 in the sequence IC6, IC7, IC8, IC9, IC10. Multiplexer 242 connects the input channels to link 252 in the sequence IC10, IC6, IC7, IC8, IC9. These sequences and the sequences effected by multiplexers 213 through 215 and 243 through 245 on links 223 through 225 and 253 through 255 are given in FIG. 4.

Network 200 (FIG. 3) further includes two time-shared, space division switches 231 and 261, time-multiplexed switches, each operative in frames comprising five time slots TS1 through TS5. During each time slot, switch 231 connects one of the links 221 through 225 to an output port 232 and switch 261 connects one of the links 251 through 255 to an output port 262. Switches 231 and 261 are reconfigured five times per frame in accordance with instructions stored in control memories 239 and 269 by a control processor 201. Information is transmitted from switch 231 via output port 232 and from switch 262 via output port 262 to a time division switch 271, a time-slot interchanger. Switch 271 performs a selection and reordering of up to five of the total of ten time slots at output ports 232 and 262 for transmission on a time-multiplexed link 281 to a demultiplexer 291. In network 200, all frames comprise five time slots. Within switch 271, the selection and reordering of time slots is accomplished based on instructions stored in a control memory 274 by control processor 201. Switch 271 performs a broadcast function within network 200 by transmitting information from a single time slot at output ports 232 or 262 on as many as all five time slots on link 281. The information in the five time slots on link 281 is then distributed by a demultiplexer 291 in sequential fashion to the five output channels OC1 through OC5.

Figure 4:
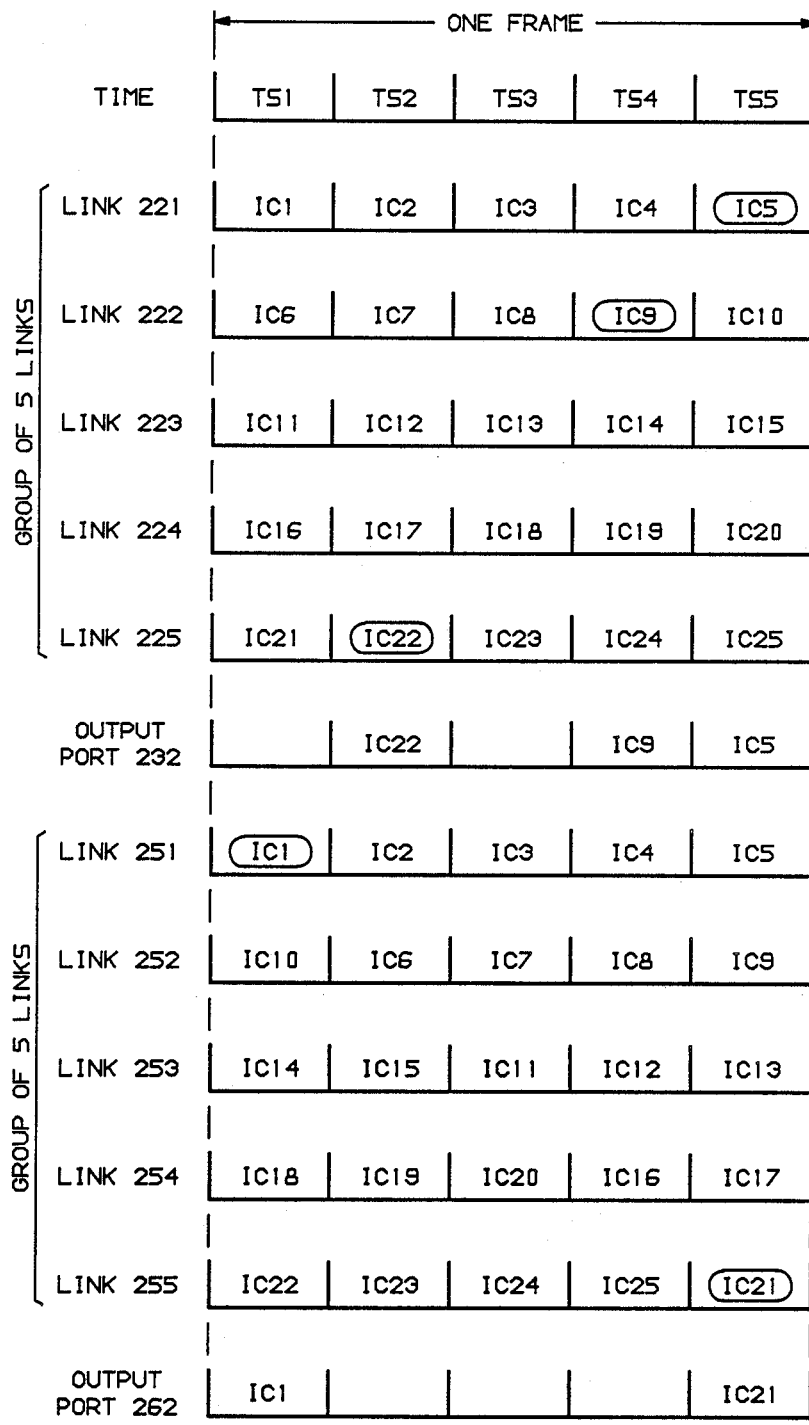
FIG. 4 is a diagram showing the connections effected by a connection arrangement included in the network of FIG. 3.

For any group of five of the input channels IC1 through IC25, network 200 is rearrangeable to avoid blocking to connect the group of five input channels to the five output channels OC1 through OC5. Consider the group of input channels IC1, IC5, IC9, IC21, and IC22. Input channel IC1 is connected to the internal channel comprising link 251, time slot TS1 (FIG. 4); input channel IC5 is connected to the internal channel comprising link 221, time slot TS5; input channel IC9 is connected to the internal channel comprising link 222, time slot TS4; input channel IC21 is connected to the internal channel comprising link 255, time slot TS5; input channel IC22 is connected to the internal channel comprising link 225, time slot TS2. Note that for the group of links 221 through 225 connected to switch 231, each of the three entries circled in the diagram of FIG. 4 comprises a different one of the time slots TS1 through TS5. Similarly, for the group of links 251 through 255 connected to switch 261, the two circled entries comprise different ones of the time slots TS1 through TS5. Thus in a particular example where output channels OC1 through OC5 are to be connected to input channels IC1, IC21, IC5, IC9 and IC22, respectively, control processor 201 writes instructions into control memory 239 such that, during time slots TS2, TS4, and TS5, switch 231 connects links 225, 222, and 221, respectively, to output port 232. Control processor 201 also writes instructions into control memory 269 such that, during time slots TS1 and TS5, switch 261 connects links 251 and 255, respectively, to output port 262. Thus the information transmitted by switch 231 at output port 232 and by switch 261 at output port 262 is as shown in FIG. 4. Control processor 201 also writes instructions into control memory 274 such that switch 271 connects time slots TS2, TS4, and TS5 at output port 232, and time slots TS1 and TS5 at output port 262 to time slots TS5, TS4, TS3, TS1, and TS2, respectively on link 281. Thus demultiplexer 291 sequentially distributes the information from input channels IC1, IC21, IC5, IC9, and IC22, to output channels OC1 through OC5, respectively. Since a corresponding group of internal channels comprising different time slots within each group of links can be found for any group of five input channels, network 100 is always rearrangeable to avoid blocking.

Figure 6:
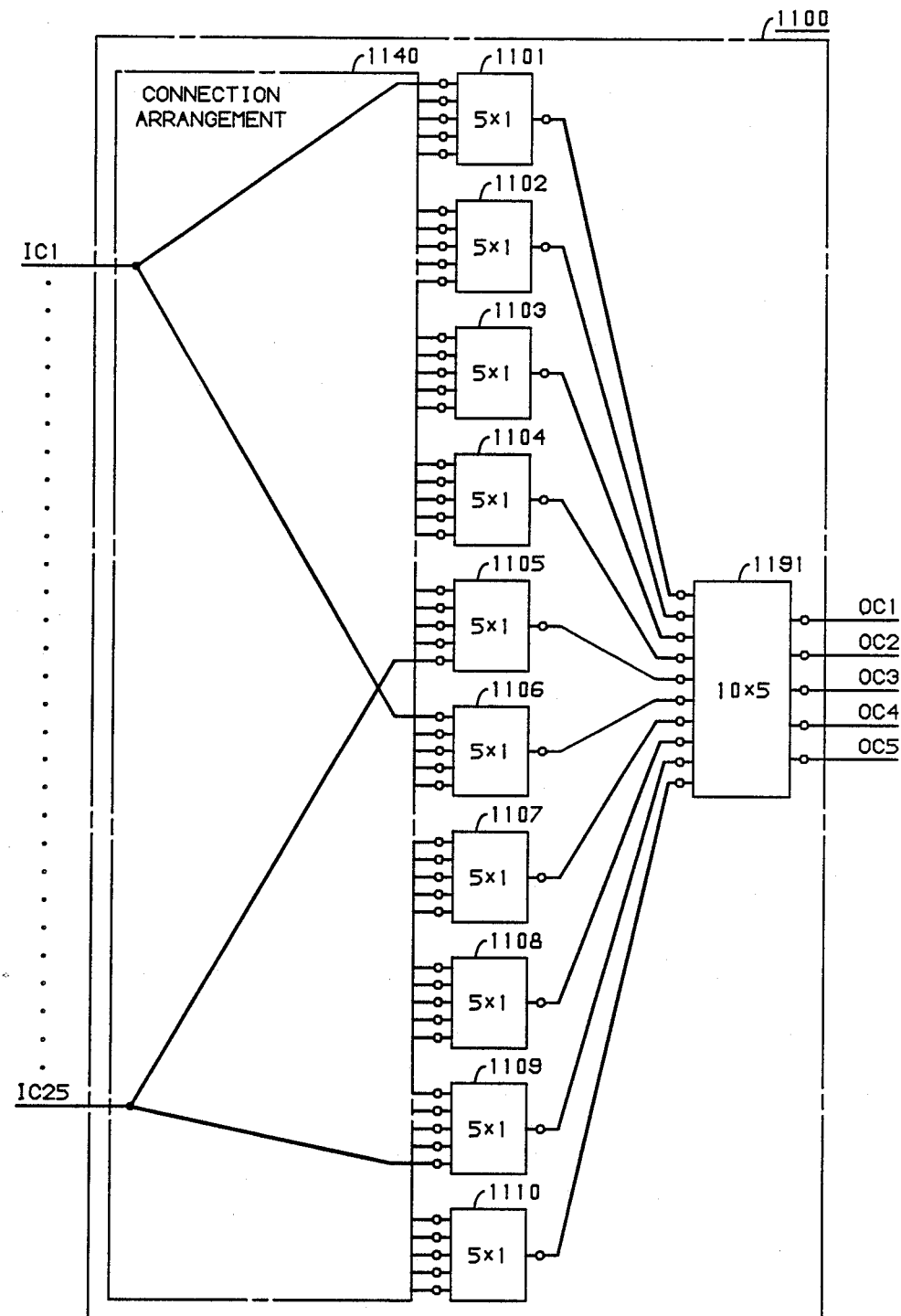
FIG. 6 is a block diagram of a prior art rearrangeable multiconnection network employing only space division switching and including a connection arrangement represented by the connection matrix shown in FIG. 5.

FIG. 6 is a block diagram of a two-stage, rearrangeable multiconnection network 1100 employing only space division switching. Network 1100 is of a type disclosed in U. S. Pat. No. 4,566,007, issued to G. W. Richards on Jan. 21, 1986. Network 1100 includes ten $5 \times 1$ first stage switches 1101 through 1110, each having five inlets and one outlet, and a single $10 \times 5$ second stage switch 1191 having each of ten inlets connected to an associated one of the first stage switches 1101 through 1110 and having each of five outlets connected to one of the output channels OC1 through OC5. The 25 input channels IC1 through IC25 are connected to the 50 first stage switch inlets by a connection arrangement 1140. Arrangement 1140 connects each first stage switch inlet to an associated predetermined one of the input channels IC1 through IC25. (Only the connections to input channels IC1 and IC25 are explicitly shown in FIG. 6.) The connection pattern within arrangement 1140 is represented by a $10 \times 5$ connection matrix shown in FIG. 5. The numbers in each of the ten rows of the matrix are the designations of the ones of the input channels IC1 through IC25 connected by arrangement 1140 to the inlets of the one of the first stage switches 1101 through 1110 associated with that row. For example, the numbers 1, 6, 11, 16, and 21 in the first matrix row indicate that arrangement 1140 connects the five input channels IC1, IC6, IC11, IC16, and IC21 to the five inlets of first stage switch 1101. The numbers 2, 7, 12, 17, and 22 in the second matrix row indicate that arrangement 1140 connects the five input channels IC2, IC7, IC12, IC17, and IC22 to the five inlets of first stage switch 1102, etc.

The characteristic of arrangement 1140 that makes network 1100 a rearrangeable broadcast network can be stated as follows. For any group of five of the input channels IC1 through IC25, there is a group of five of the first stage switches 1101 through 1110 each having one inlet connected to a different one of that group of input channels. For example, consider the group of input channels IC1, IC5, IC9, IC21 and IC22. Each switch of the group of first stage switches 1102, 1104, 1105, 1106 and 1110 has one inlet connected to a different one of that group of input channels. Switch 1102 has an inlet connected to input channel IC22, switch 1104 has an inlet connected to input channel IC9, switch 1105 has an inlet connected to input channel IC5, switch 1106 has an inlet connected to input channel IC1, and switch 1110 has an inlet connected to input channel IC21. It is possible that for certain sequences of connection requests for input channels IC1, IC5, IC9, IC21 and IC22, network 1100 may temporarily block one or more of the requested input channels. However, it is always possible to rearrange the connections of the first stage switches such that switches 1102, 1104, 1105, 1106, and 1110 connect input channels IC22, IC9, IC5, IC1, and IC21, respectively, to inlets of second stage switch 1191. The connections within second stage switch 1191 can then be rearranged such that the input channels IC1, IC5, IC9, IC21, and IC22 are connected to the output channels OC1 through OC5 in accordance with the connection requests. Since this is possible for any group of five of the input channels IC1 through IC25, network 1100 is a rearrangeable broadcast network.

In networks such as network 1100, N input channels are connected to the inlets of S first stage switches in an assignment pattern where each input channel is connected to M first stage switch inlets. The assignment pattern is termed input channel resolvable if the input channels can be partitioned into MN/S factors, each factor including S/M input channels, where each first stage switch is connected to exactly one input channel from each factor. In network 1100 where N=25, S=10, and M=2, the assignment pattern is input channel resolvable since the input channels can be partitioned into the five factors: {IC1,IC2,IC3,IC4,IC5}, {IC6,IC7,IC8,IC9,IC10}, {IC11,IC12,IC13,IC14,IC15}, {IC16,IC17,IC18,IC19,IC20}, {IC21,IC22,IC23,IC24,IC25}.

Figure 7:
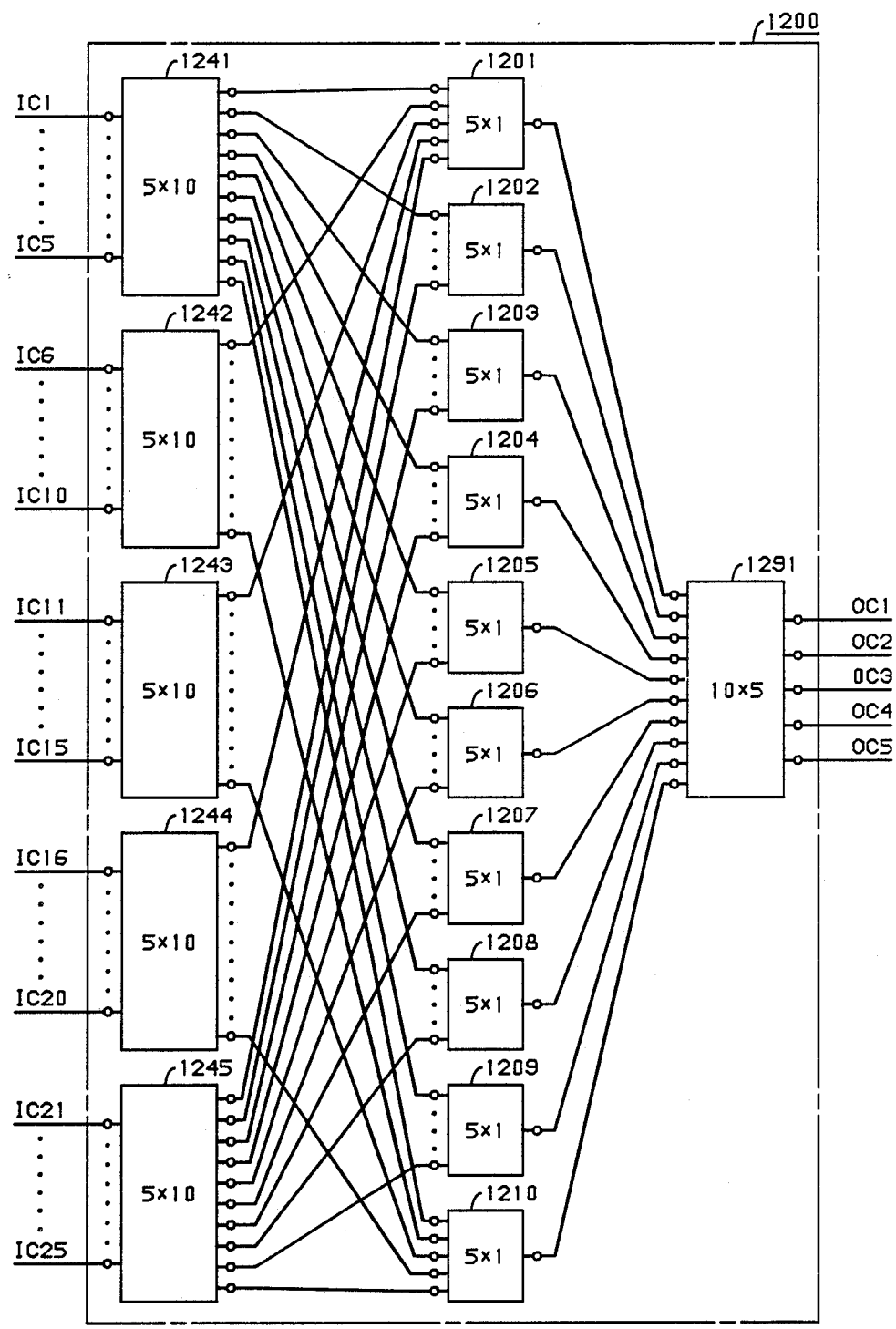
FIG. 7 is a block diagram of a space division network representing an intermediate step in the design of the networks of FIGS. 1 and 3.

Network 1100 can be used as a starting point to design the rearrangeable broadcast networks 100 (FIG. 1) and 200 (FIG. 3). Network 1200 (FIG. 7) is a three-stage space division network that represents an intermediate step in the design. In network 1200, the ten 5×1 second stage switches 1201 through 1210 and the 10×5 third stage switch 1291 are identical to the first stage switches 1101 through 1110 and the second stage switch 1191 of network 1100 (FIG. 6). The connection arrangement 1140 of network 1100 is replaced in network 1200 by five 5×10 first stage switches 1241 through 1245 each having five inlets connected to one of the five factors. Switch 1241, for example, has five inlets connected to the factor {IC1,IC2,IC3,IC4,IC5}. The input channels can clearly be distributed in any arbitrary fashion to the second stage switches 1201 through 1210. Accordingly, each of the second stage switches 1201 through 1210 has access to exactly one input channel from each factor. If the distribution of input channels to second stage switches in network 1200 is made the same as the distribution of input channels to first stage switches in network 1100, network 1200 is also a rearrangeable broadcast network. Furthermore, the connections through the first stage switches 1241 through 1245 can be fixed and still achieve this result.

Network 1200 is then transformed into network 100 (FIG. 1) as follows. The first step is to replace all links out of first stage switches and all links into third stage switches with single links each having a number of time slots equal to the number of replaced links. The ten links in network 1200 out of first stage switch 1241, for example, are replaced in network 100 by the single link 121 having ten time slots. The ten links into third stage 1291 switch in network 1200 are replaced by the single link having ten time slots at output port 132 in network 100. Second, the space division first and third stage switches of network 1200 are replaced with corresponding time division elements. Third stage switch 1291 of network 1200 is replaced by time division switch 141, time-multiplexed link 151 having five time slots, and demultiplexer 161. Since the connections through the first stage switches 1241 through 1245 of network 1200 can be fixed, the first stage switches 1241 through 1245 are replaced by multiplexers 111 through 115 in network 100 rather than time division switches. Multiplexers 111 through 115 function as fixed time slot interchangers to connect input channels to the ten time slots of the links 121 through 125 as shown in FIG. 2. Finally the second stage switches 1201 through 1210 of network 1200 are replaced by space division switch 131 in network 100.

During each frame of operation within network 100, each of the multiplexers 111 through 115 transmits each input channel to switch 131 twice in a fixed predetermined fashion. Thus time division switch 141 has two opportunities per frame to access a given input channel. Since network 100 is combinatorially equivalent to networks 1100 and 1200, network 100 is a rearrangeable broadcast network.

Network 100 can be extended to serve additional output channels by providing space division switch 131 with additional switching capability to access additional output ports, and by adding additional time division switches and demultiplexers. Two serve five additional output channels OC6 through OC10, space division switch 131 is extended to selectively connect any one of the links 121 through 125 to an additional output port 133. Switch 131 has broadcast capability in that any one of the links 121 through 125 can be simultaneously connected to both output ports 132 and 133. Information transmitted by switch 131 from output port 133 is received by an additional time division switch 146. Switch 146 performs a selection and reordering of up to five of the ten time slots at output port 133 for transmission on a time-multiplexed link 156 to a demultiplexer 166. Within switch 146, the selection and reordering of time slots is accomplished based on instructions stored in a control memory 149 by control processor 101.

Network 100 has advantages over network 1100. First, each input channel has only a single appearance on the network. The equivalent of multiple appearances is achieved by having the multiplexers transmit each input channel M times per frame to space division switch 131. Second, rearrangements are effected without the possibility of open intervals or lost information. A rearrangement in network 100 simply means that the connections through space division switch 131 and time division switch 141 are changed before the next frame.

Network 100 also has advantages over conventional time-space-time networks. In network 100, fixed time-slot assignments are effected on the input side of the network by permanent connection arrangement 110 and variable time-slot assignments are effected on the output side of the network by time division switch 141. In conventional time-space-time networks, variable time-slot assignments are made on both sides of the network and path hunts are performed by matching idle time slots between the input time stage and the space stage with idle time slots between the space stage and the output time stage. The path hunt process is typically performed by querying global dynamic network status information. In network 100, only the output side of the network makes variable time-slot assignments. If control processor 101 has access to the time-slot assignment patterns effected by permanent connection arrangement 110 (either by referring to a stored table or performing an algorithm), network 100 is controllable solely from the output side of the network. If network 100 is controlled by local control processors associated with each of the time division switches rather than by the single control processor 101, each of the local control processors can perform its control functions to set up connections independently using only local information. This presents an opportunity to avoid bottleneck control path problems.

Network 100 has links operating at two speeds since the internal links such as links 121 through 125 and the links at output ports 132 and 133 each have ten time slots whereas links 151 and 156 have only five time slots. This 2:1 ratio is equal to the multiplicity factor M. The number of time slots on all links can be made equal using an alternative implementation having multiple space division switches. Network 200 (FIG. 3) represents such an alternative for network 100.

Network 200 can be extended to serve additional output channels by providing space division switches 231 and 261 with additional switching capability to access additional output ports, and by adding additional time division switches and demultiplexers. To serve five additional output channels OC6 through OC10, space division switch 231 is extended to selectively connect any one of the links 221 through 225 to an additional output port 233. Space division switch 261 is extended to selectively connect any one of the links 251 through 255 to an additional output port 263. Switches 231 and 261 both have broadcast capability. Information transmitted by switch 231 from output port 233 and by switch 261 from output port 263 is received by an additional time division switch 276. Switch 276 performs a selection and reordering of up to five of the total of ten time slots at output ports 233 and 263 for transmission on a time-multiplexed link 286 to a demultiplexer 296. Within switch 276, the selection and reordering of time slots is accomplished based on instructions stored in a control memory 279 by control processor 201.

The above-referenced Richards U.S. Pat. No. 4,566,007 discloses a single design method for determining the assignment pattern for the connection arrangement in a two-stage rearrangeable space division broadcast network. Other more general design methods involving well-known combinatorial structures—block designs, orthogonal arrays and difference sets—are disclosed in U.S. patent application 946,431 of F. K. Hwang et al. filed Dec. 23, 1986. Any such space division broadcast network can be used to derive a broadcast network employing both space and time division switching in accordance with the invention as long as the assignment pattern is input channel resolvable.

Network 100 (FIG. 1) can be described in more general terms as follows. Network 100 is operative in time division frames comprising B time slots of substantially fixed duration and provides switched connections from $N_1$ input channels to $n_2$ output channels, where B, $N_1$ and $n_2$ are positive integers each greater than one and where $n_2$ is at most equal to $N_1$. (In network 100, B=10, $N_1$=25 and $n_2$=5 and the B time slots are the ten time slots TS1 through TS10.) Network 100 comprises AB internal channels comprising A links each operative in the B time slots, where A is a positive integer greater than one. (In network 100, A=5 and the A links are the five links 121 through 125.) Network 100 includes space division switch 131 connected to the A links and having output port 132 for providing space-switched connections from the A links to output port 132. Network 100 further includes time division switch 141 and demultiplexer 161 for providing time-switched connections from time slots at output port 132 to the $n_2$ output channels. Permanent connection arrangement 110 permanently connects each of the $N_1$ input channels to multiple ones of the AB internal channels such that for any group of n of the input channels, network 100 is rearrangeable to avoid blocking to connect the group of $n_2$ of the input channels to the $n_2$ output channels. Network also includes control processor 101 responsive to a blocked condition of network 100 for controlling a rearrangement of connections of space division switch 131 and time division switch 141. In particular, permanent connection arrangement 110 connects each of the $N_1$ input channels to M of the AB internal channels such that for any group of $n_2$ of the input channels, the group of $n_2$ of the input channels is connected to a corresponding group of $n_2$ of the internal channels. Each internal channel of the group of $n_2$ of the internal channels comprises a different one of the B time slots. M is a positive integer greater than one and at most equal to $AB/N_1$. (In network 100, M=2.)

Network 200 (FIG. 3) can be described in more general terms as follows. Network 200 is operative in time division frames comprising B time slots of substantially fixed duration and provides switched connections from $N_1$ input channels to $n_2$ output channels, where B, $N_1$ and $n_2$ are positive integers each greater than one and where $n_2$ is at most equal to $N_1$. (In network 200, B=5, $N_1$=25 and $n_2$=5 and the B time slots are the five time slots TS1 through TS5.) Network 200 comprises AB internal channels comprising A links each operative in the B time slots, where A is a positive integer greater than one. (In network 200, A=10 and the A links are the ten links 221 through 225 and 251 through 255.) The A links comprise K groups each comprising at most C links, where M is a positive integer greater than one and at most equal to $AB/N_1$, K is a positive integer greater than one and most equal to M, and C is a positive integer greater than one and at most equal to $\lceil N_1/B \rceil \lceil M/K \rceil$, where $\lceil X \rceil$ denotes the smallest integer not less than x. (In network 200, M=2, K=2 and the K groups of links are two groups of five links—the group comprising links 221 through 225 and the group comprising links 251 through 255.) Network 200 includes a space division switching stage connected to the A links and having at least K output ports. The space division switching stage comprises K space division switches each for providing space-switched connections from one of the K groups of links to one of the K output ports. (In network 200, space division switch 231 provides space-switched connections from the group of links 221 through 225 to output port 232 and space division switch 261 provides space-switched connections from the group of links 251 through 255 to output port 262.) Network 200 further includes time division switch 271 and demultiplexer 291 for providing time-switched connections from time slots at output ports 232 and 262 to the $n_2$ output channels. Permanent connection arrangement 210 permanently connects each of the $N_1$ input channels to multiple ones of the AB internal channels such that for any group of $n_2$ of the input channels, network 200 is rearrangeable to avoid blocking to connect the group of $n_2$ of the input channels to the $n_2$ output channels. Network 200 also includes control processor 201 responsive to a blocked condition of network 100 for controlling a rearrangement of connections of space division switches 231 or 261 and time division switch 271. In particular, permanent connection arrangement 210 connects each of the $N_1$ input channels to M of the internal channels such that for any group of $n_2$ of the input channels, the group of $n_2$ of the input channels is connected to a corresponding group of $n_2$ of the internal channels. For each of the K groups of links, each internal channel of the group of $n_2$ internal channels that is on that group of links comprises a different one of the B time slots.

What is claimed is:

1. A switching network operative in time division frames comprising B time slots of substantially fixed duration for providing switched $N_1$ and $n_2$ being positive integers each greater than one being at most equal to connections from $N_1$ input channels to $n_2$ output channels, B, $N_1$, said switching network comprising AB internal channels comprising A links operative in said B time slots, A being a positive integer greater than one, space division switching means connected to said A links and having at least one output port for providing space-switched connections from said A links to said output port, time division switching means connected to said output port for providing time-switched connections from time slots at said output port to said $n_2$ output channels and connection means for permanently connecting each of said $N_1$ output channels to multiple ones of said AB internal channels, at least one of said $N_1$ input channels being permanently connected to multiple ones of said AB internal channels, said last-mentioned multiple ones comprising different ones of said B time slots.

2. A switching network in accordance with claim 1 wherein said connection means permanently connects each of said $N_1$ input channels to multiple ones of said AB internal channels such that for any group of $n_2$ of said input channels, said switching network is broadcast rearrangeable to avoid blocking to connect said group of $n_2$ of said input channels to said $n_2$ output channels.

3. A switching network in accordance with claim 2 further comprising control means responsive to a blocked condition of said network for controlling a rearrangement of connections of said space division switching means and said time division switching means.

4. A switching network in accordance with claim 3 wherein said connection means comprises multiplexer means for multiplexing said $N_1$ input channels onto said A links such that each of said $N_1$ input channels is assigned to multiple, predetermined ones of said AB internal channels.

5. A switching network in accordance with claim 4 wherein said group of $n_2$ of said input channels is connected to a corresponding group of $n_2$ of said internal channels, each internal channel of said group of $n_2$ of said internal channels comprising a different one of said B time slots.

6. A switching network in accordance with claim 3 wherein said A links comprise K groups each comprising at most C links, K being a positive integer greater than one and at most equal to M, M being a positive integer greater than one and at most equal to $AB/N_1$, C being a positive integer greater than one and at most equal to $\lceil N_1/B \rceil \times \lceil M/K \rceil$, wherein said space division switching means has at least K output ports and comprises K space division switching means each for providing space-switched connections from one of said K groups of links to one of said K output ports, wherein said time division switching means is connected to said K output ports and provides time-switched connections from time slots at said K output ports to said $n_2$ output channels, and wherein said connection means permanently connects each of said $N_1$ input channels to M of said AB internal channels such that for any group of $n_2$ of said input channels, said group of $n_2$ of said input channels is connected to a corresponding group of $n_2$ of said internal channels where, for each of said K groups of links, each internal channel of said group of $n_2$ of said internal channels that is on that group of links comprises a different one of said B time slots.

7. A switching network in accordance with claim 1 further comprising control means responsive to a blocked condition of said network for controlling a rearrangement of connections of said space division switching means and said time division switching means.

8. A switching network in accordance with claim 1 wherein said connection means comprises multiplexer means for multiplexing said $N_1$ input channels onto said A links such that each of said $N_1$ input channels is assigned to multiple, predetermined ones of said AB internal channels.

9. A switching network in accordance with claim 1 wherein said connection means permanently connects each of said $N_1$ input channels to M of said AB internal channels such that for any group of $n_2$ of said input channels, said group of $n_2$ of said input channels is connected to a corresponding group of $n_2$ of said internal channels, each internal channel of said group of $n_2$ of said internal channels comprising a different one of said B time slots, M being a positive integer greater than one and at most equal to $AB/N_1$.

10. A switching network in accordance with claim 1 wherein said A links comprise K groups each comprising at most C links, K being a positive integer greater than one and at most equal to M, M being a positive integer greater than one and at most equal to $AB/N_1$, C being a positive integer greater than one and at most equal to $\lceil N_1/B \rceil \times \lceil M/K \rceil$, where said space division switching means has at least K output ports and comprises K space division switching means each for providing space-switched connections from one of said K groups of links to one of said K output ports, wherein said time division switching means is connected to said K output ports and provides time-switched connections from time slots at said K output ports to said $n_2$ output channels, and wherein said connection means permanently connects each of said $N_1$ input channels to M of said AB internal channels such that for any group of $n_2$ of said input channels, said group of $n_2$ of said input channels is connected to a corresponding group of $n_2$ of said internal channels where, for each of said K groups of links, each internal channel of said group of $n_2$ of said internal channels that is on that group of links comprises a different one of said B time slots.

11. A switching network for providing switched connections from $N_1$ input channels to $n_2$ output channels, $N_1$ and $n_2$ being positive integers each greater than one, $n_2$ being at most equal to $N_1$, said switching network comprising a plurality of time-multiplexed links operative in frames comprising a plurality of time slots, space division switching means connected to said links and each having at least one output port for providing space-switched connections from said links to said output port, time division switching means connected to said output port for providing time-switched connections from time slots at said output port to said $n_2$ output channels, and a plurality of multiplexer means each for multiplexing a subset of said $N_1$ input channels onto one of said links such that each of said subset of input channels is assigned to multiple, predetermined time slots of each of said frames on said one of said links.

12. A switching network in accordance with claim 11 where for any group of $n_2$ of said input channels, said switching network is broadcast rearrangeable to avoid blocking to connect said group of $n_2$ of said input channels to said $n_2$ output channels.

13. A switching network in accordance with claim 12 further comprising control means responsive to a blocked condition of said network for controlling a rearrangement of connections of said space division switching means and said time division switching means.

14. A switching network for providing switched connections from $N_1$ input channels to $n_2$ output channels, $N_1$ and $n_2$ being positive integers each greater than one, $n_2$ being at most equal to $N_1$, said switching network comprising a plurality of arrangements each comprising a plurality of time-multiplexed links operative in frames comprising a plurality of time slots, space division switching means connected to said links and having at least one output port for providing space-switched connections from said links to said output port, and a plurality of multiplexer means each for multiplexing a subset of said $N_1$ input channels onto one of said links such that each of said subset of input channels is assigned to a predetermined time slot of each of said frames on said one of said links, said switching network further comprising time division switching means for providing time-switched connections to said $n_2$ output channels from time slots at said output ports of said space division switching means of each of said arrangements, where one of said $N_1$ input channels is assigned to a first time slot on one of said links of a first one of said arrangements and is assigned to a second time slot on one of said links of a second one of said arrangements, said first and second time slots comprising different time slots of a frame, and where for any group of $n_2$ of said input channels, said switching network is broadcast rearrangeable to avoid blocking to connect said group of $n_2$ of said input channels to said $n_2$ output channels.

15. A switching network in accordance with claim 14 further comprising control means responsive to a blocked condition of said network for controlling a rearrangement of connections of said time division switching means and connections of the space division switching means of at least one of said arrangements.

* * * * *

UNITED STATES PATENT AND TRADEMARK OFFICE
CERTIFICATE OF CORRECTION

PATENT NO. : 4,817,083
DATED : March 28, 1989
INVENTOR(S) : Gaylord W. Richards

It is certified that error appears in the above-identified patent and that said Letters Patent is hereby corrected as shown below:

Column 10, line 68, after "switched" insert --connections from--,
    after "$N_1$" insert --input channels to--,
    delete "and",
    after "$n_2$" insert --output channels, B, $N_1$, and $n_2$--
Column 11, line 1, after "one" insert --, $n_2$--;
Column 11, line 2, delete "connections from $N_1$ input channels to $n_2$ output";
Column 11, line 3, delete "channels, B,";
Column 11, line 16, "$N_1$ output" should be "$N_1$ input";
Column 12, line 34, "where" should be "wherein".

Signed and Sealed this

Tenth Day of July, 1990

Attest:

HARRY F. MANBECK, JR.

*Attesting Officer*      *Commissioner of Patents and Trademarks*